United States Patent [19]

Sumida et al.

[11] Patent Number: 4,643,304
[45] Date of Patent: Feb. 17, 1987

[54] TAPE CARTRIDGE WITH EXTENDING REFERENCE SURFACES

[75] Inventors: Takashi Sumida, Takatsuki; Shigeo Sasaki, Kyoto; Takao Ketori, Osaka, all of Japan

[73] Assignee: Hitachi Maxell, Ltd., Osaka, Japan

[21] Appl. No.: 669,844

[22] Filed: Nov. 9, 1984

[30] Foreign Application Priority Data

Nov. 12, 1983 [JP] Japan .................................. 58-213003
Mar. 2, 1984 [JP] Japan .................................. 59-040781

[51] Int. Cl.⁴ .......................................... B65D 85/672
[52] U.S. Cl. .................... 206/387; 242/197; 360/134
[58] Field of Search ............... 206/387; 220/337–342, 220/334; 242/198, 199, 197, 200; 360/96.1, 132, 134

[56] References Cited

U.S. PATENT DOCUMENTS

| | | | |
|---|---|---|---|
| 4,363,456 | 12/1982 | Goto | 242/197 |
| 4,389,690 | 6/1983 | Oishi et al. | 360/132 |
| 4,422,599 | 12/1983 | Okamura et al. | 242/198 |
| 4,470,560 | 9/1984 | Yoneya et al. | 242/198 |
| 4,485,988 | 12/1984 | Kikuya et al. | 242/198 |
| 4,485,990 | 12/1984 | Ogiro et al. | 242/199 |
| 4,496,119 | 1/1985 | Sieben | 242/198 |
| 4,519,521 | 5/1985 | Yoshii | 206/387 X |
| 4,524,926 | 6/1985 | Nemoto et al. | 242/198 |

Primary Examiner—William Price
Assistant Examiner—Bryon Gehman
Attorney, Agent, or Firm—Birch, Stewart, Kolasch & Birch

[57] ABSTRACT

In a tape cartridge of the type having a front lid for protection of the tape and the position thereof in a tape player is decided by a positioning member of the tape player, a reference face of the tape cartridge to which the positioning member of the tape player abuts is provided on the front end portion of the side wall of the cartridge so as to avoid interference with the front lid and the positioning member and to avoid the need for providing an opening in the front lid for passing the positioning member.

2 Claims, 23 Drawing Figures

TAPE CARTRIDGE WITH EXTENDING REFERENCE SURFACES

FIELD OF THE INVENTION

The present invention relates to a tape cartridge, and more particularly to a tape cartridge of the type having a lid member on the front portion of the cartridge to protect the tape of the cartridge.

BACKGROUND OF THE INVENTION

A recording tape cartridge such as a video tape cartridge or an audio tape cartridge of the digital type is provided with a movable lid on the front portion of the cartridge case and is adapted to be mounted on a recording/reproducing apparatus (referred to as a tape player hereinafter) in such a manner that the video tape cartridge is manually inserted in the housing of the tape player in a horizontally laid attitude and is moved downward toward the loading postion with the lid of the tape cartridge opened during the downward movement. In actual use, it is required that the video tape must be so positioned at the loading position that the drive shaft insertion holes of the hubs of the video tape cartridge can be correctly engaged with the drive shafts of the tape player. For this purpose, the tape cartridge must be precisely positioned at the end of the horizontal movement of the manual insertion of the cartridge. In order to regulate the position of the video tape cartridge, conventionally there is provided a positioning member in the tape player which is adapted to contact a part of the front end face of the case of the tape cartridge through an opening defined on the front plate of the lid.

In general, in the positioning arrangement, it is preferred to make the contact area of the positioning member of the tape player as large as possible so as to ensure the positioning of the cartridge. For achieving this, it is necessary to expand the opening of the lid for allowing the passage of the enlarged positioning member of the tape player. However, a large opening on the front lid decrease the mechanical strength of the front lid. In addition since the conventional positioning member of the tape player is adapted to engage the front portion of the tape cartridge near the recording tape, the tape may be easily harmed due to undesired contact with the enlarged positioning member. In view of the condition as described above, the opening of the lid in fact can not be expanded. It has be considered to open the lid member as large as possible in a range so as not to decrease the mechanical strength of the lid member so as to allow the positioning member of the tape player to contact the front portion of the cartridge through the opening for positioning. By this arrangement, the above mentioned problem may be solved. However, on the contrary, there occurs the problem that since the size of the positioning member must be determined corresponding to the size of the opening, when the tape cartridge is mounted in the tape player with a sudden force, the tape cartridge may ride over the positioning member, whereby the tape cartridge will not be positioned in the correct position.

Since the conventional positioning mechanism uses such a construction as to provide the opening in the front lid of the cartridge for receiving the positioning member, there are many restrictions and therefore the conventional positioning mechanism used in the tape cartridge is not able to comply with the requirement of the variation of the tape cartridges.

SUMMARY OF THE INVENTION

An essential object of the present invention is to provide a tape cartridge which can be readily positioned at the correct position of the tape player, Another object of the present invention is to provide a tape cartridge which ensures an engagement of the part of the tape cartridge with the positioning member of the tape player so as to assure correct positioning of the tape cartridge on the tape player without lowering the mechanical strength of the front lid member of the tape cartridge, preventing undesired contact of the positioning member of the tape player with the tape.

These and other objects and features of the present invention will be apparent from the description of the preferred embodiments of the present invention described hereinafter with reference to the attached drawings.

According to the present invention, there is provided a tape cartridge characterized in that a reference surface is provided by the end face formed on the side walls of the csae body, the end face being directed in the front direction so as to set the case body in a position in relation to the front and rear directions of a tape player.

DETAILED DESCRIPTION OF THE PREFERRED EMBODIMENTS

Before proceeding with the description, it is noted that like parts are designated by like reference numerals throughout the attached drawings.

Figure 1:
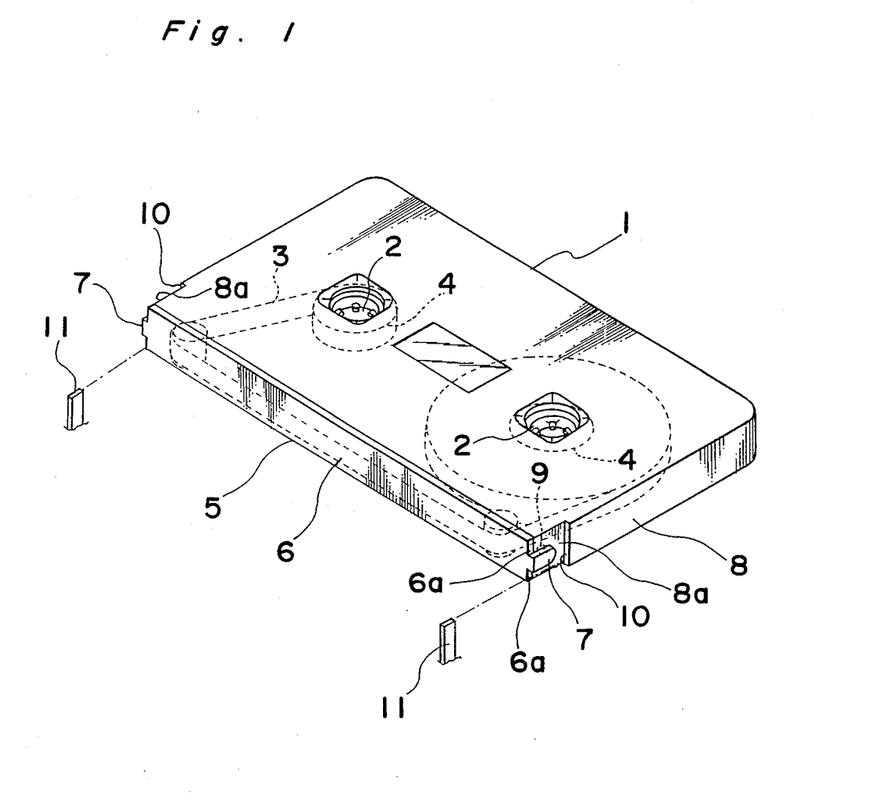
FIG. 1 is a perspective outside view showing one embodiment of a tape cartridge according to the present invention with a front lid closed.
Figures 2, 3:
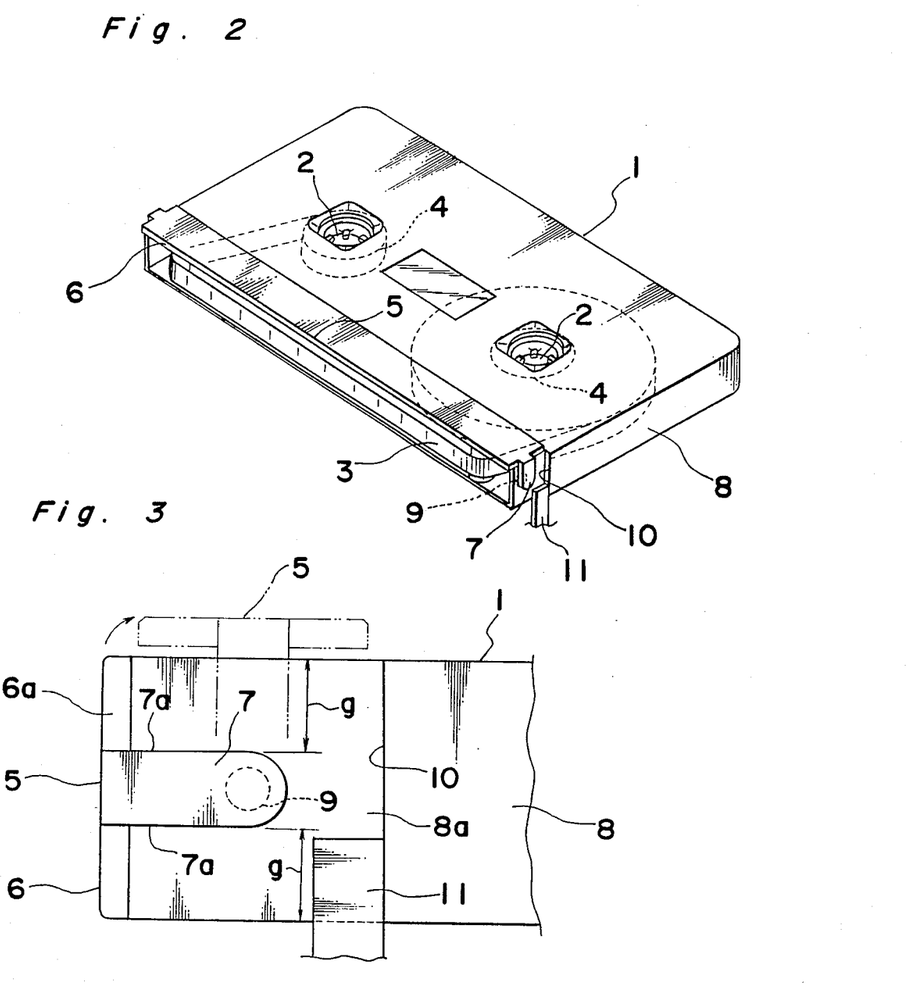
FIG. 2 is a perspective outside view of the the tape cartridge shown in FIG. 1 with the front lid opened.
FIG. 3 is a partial side view of the tape cartridge shown in FIG. 1.

Referring to FIGS. 1 to 3, an audio recording tape cartridge of the digital type is shown. A case body 1 of the tape cartridge has a pair of drive shaft insertion holes 2 vertically penetrating through the case body 1 on the central portion of the case body 1 and a pair of rotatable hubs 4 on which a recording tape 3 is wound. The recording tape 3 is released from one of the hubs towards the front portion of the case body 1 and the released tape can be taken up on the other hub. In the embodiment shown, the front portion of the case body 1 is fully opened between the left end and the right end and it is expected that the recording tape 3 can be extracted frontwardly from the front opening of the case body 1 when the tape cartridge is mounted on the tape player. The present invention can be applied to so called a Philips type cartridge.

A front lid 5 is movably mounted on the front portion of the case body 1 so as to be moved between the open position and the closed position. The front lid 5 comprises a generally flat front plate 6 for closing the front opening of the case body 1 over all between the left end and the right end and a pair of connecting arms 7 projected rearwardly from both side ends of the case body 1. The front lid 5 is formed by plastic molding. The connecting arms 7 are rotatably and detachably coupled on recessed side walls 8a of the side walls 8 through supporting shafts 9 so that the front lid 5 can be rotated in both upward and downward direction around the supporting shafts 9 for opening.

The recessed side walls 8a are formed on the front end portion of the side walls 8 and each have a generally flat surface but recessed inwardly from the outer face of the side wall 8 through a stepped front end wall 10. The connecting arms 7 of the front lid 5 are respectively positioned generally parallel along the recessed side walls 8a and rotatably supported as described above. The front lid 5 is normally exerted toward the closed position by a spring (not shown) for closing the front opening of the case body 1 by the front plate 6.

Each of the stepped front end walls 10 is a vertical wall having a generally flat face directed toward the front direction at the outermost part of the case body 1 in the lateral direction or left and right directions. The face of each of the stepped front end walls 10 is perpendicular to the direction of the insertion of the case body 1 into the tape player.

The recessed side walls 8a extend parallel to each other or may be slightly tapered such that the distance between both recessed side walls is narrower in the front portion than the distance at the rear portion.

The front lid 5 is so arranged that both lateral ends 6a of the front plate 6 are flush with both side walls 8 respectively without being projected outwardly from the side walls 8. Furthermore, since the case body 1 is used with the top and bottom reversed, it is necessary that the front lid 5 can be opened in both the upward and downward directions from the closed position. Therefore, the connecting arms 7 are formed with a width narrower than the width of the front plate 6 and are projected rearwardly from the central portion relative to the vertical direction of the case body 1. When the front lid 5 is in the closed position as shown in FIGS. 1 or 3 (by real line), there are defined spaces g between the top edge of the case body 1 and the top edge of the connecting arm 7 and between the bottom edge of the case body 1 and and the bottom edge of the connecting arm 7.

By the arrangement as described above, the stepped front end wall 10 serves as the reference surface of the tape cartridge for positioning in the tape player as hereinafter explained.

The positioning member 11 is secured in the tape player in position for determining the correct position of the tape cartridge. Upon entering of the case body 1 of the tape cartridge of which front lid 5 is in the closed position with the horizontally laid attitude into the tape player, advancing horizontally, the case body 1 is moved into the interior of the tape player with the side wall 8 opposing the positioning member 11 and without any interference between the positioning member 11 and the front lid 5. When it is assumed that the positioning member 11 moves relative to the case body 1, the positioning member 11 moves along one of the upper or lower spaces g (normally the lower space g) and abut onto the front surface of the stepped front end wall 10 as shown in FIG. 3 so that the case body 1 can be positioned at the correct position with respect to the front and rear directions. When the tape cartridge is reversed, the same operation can be made.

It is desired to provide a pair of the positioning members 11 at positions of the tape player corresponding to both outer sides of the cartridge case 1 so the respective positioning members 11 can abut onto the respective stepped front end walls 10 situated on the left side and the right side of the case body 1 for positioning the cartridge case 1, however, the positioning member may be provided only on one side.

When the recessed side walls 8a are tapered as described above, when inserting the case body 1 into the tape player the positioning members are readily guided by the tapered walls without causing the positioning member to be engaged with the front portion of the case body, thereby facilitating the insertion of the case body.

Figure 4:
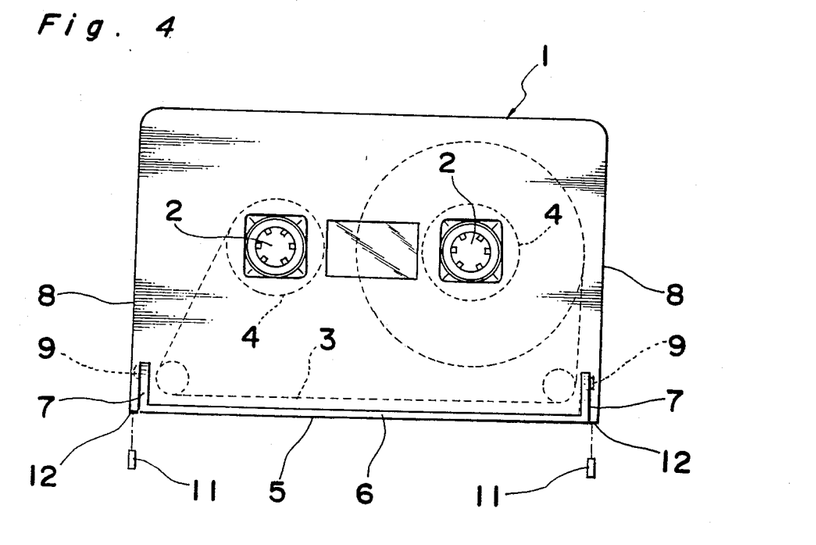
FIG. 4 is a top plan view showing another embodiment of the tape cartridge according to the present invention.
Figure 5:
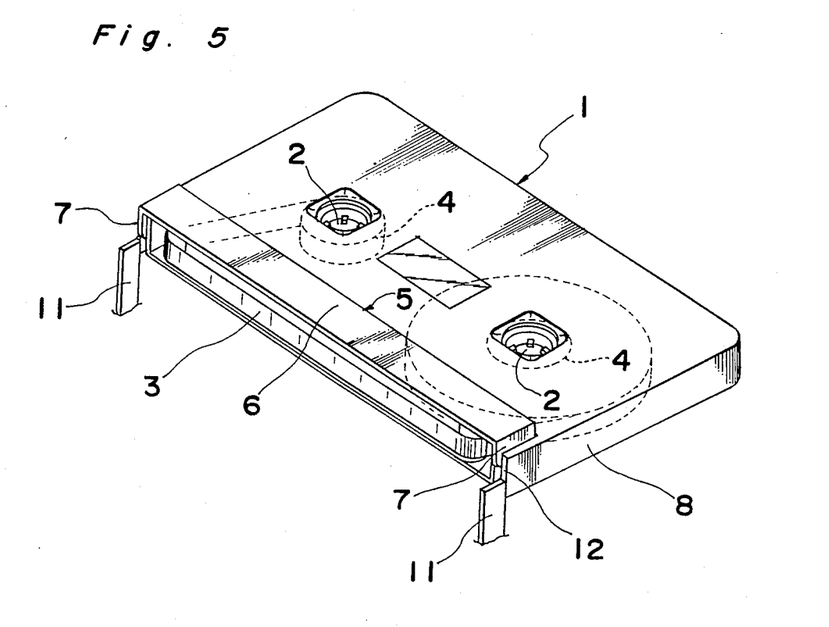
FIG. 5 is a perspective view of the tape cartridge shown in FIG. 4.

FIGS. 4 and 5 show the second embodiment of the tape cartridge according to the present invention in which the side walls 8 are formed having a uniform thickness without recessed side walls 8a, the front portions thereof project beyond the support shafts 9 of the front lid 5 and the connecting arms 7 are rotatably engaged with both inner faces of the side walls 8. In this embodiment, front end faces 12 of the both side walls 8 are formed as vertical flat planes serving as the reference planes to which the positioning member or members 11 of the tape player can abut for positioning the tape cartridge.

According to the second embodiment, the positioning member of the tape player can abut the reference face 12 without being interfered with by the support shaft 9 of the front lid 5. In addition, the positioning member of the tape player can abut the entire width of the reference face 12, whereby when the tape cartridge is inserted into the inside of the housing of the tape player, it will prevent the tape cartridge from erronously passing over the positioning member. In addition since the positioning member is adapted to contact the central portion of the reference face 12 in the vertical direction of the case body, when the top and bottom of the tape cartridge is reversed, the positioning member of the tape player can always abut the same portion of the reference face 12, so that positioning of the tape cartridge can be assured with a high degree of accuracy compared to such tape cartridge in which the portion of the reference face 12 to which the positioning member abut changes when the top and bottom of the tape cartridge is reversed.

FIGS. 6 through 12 show a third embodiment of the tape cartridge according to the present invention in which the arrangement of support for the connecting arms 7 of the the front lid 5 is further improved from the second embodiment. In the third embodiment, the reference faces for positioning are provided by the flat vertical front end faces 12 of the side walls.

A front lid 5 is movably mounted on the front portion of the case body 1 so as to be moved between the opened position and the closed position. The front lid 5 comprises a generally flat front plate 6 for closing the front opening of the case body 1 over all between the left end and the right end and a pair of connecting arms 7 projected rearwardly from the both side ends of the case body 1. The front lid 5 is formed by a plastic molding. The connecting arms 7 are rotatably and detachably coupled on recessed side walls 8a of the side walls 8 through supporting shafts 9 so that the front lid 5 can be rotated in both upward and downward directions around the supporting shafts 9 for opening.

A pair of lid supporting members 16 are mounted in both side end portions of the front portion of the case body 1 so as to slide along the inner faces of the side walls 8.

There are provided spring means for exerting the lid supporting members 16 in the backward direction of the case body 1. In this embodiment the spring means is arranged in such a manner that a pulling coil spring 19 is suspended between the rear end of the lid supporting member 16 and an engaging member (not shown) projected on the rear portion of the bottom wall 1a of the case body 1.

Figure 7:
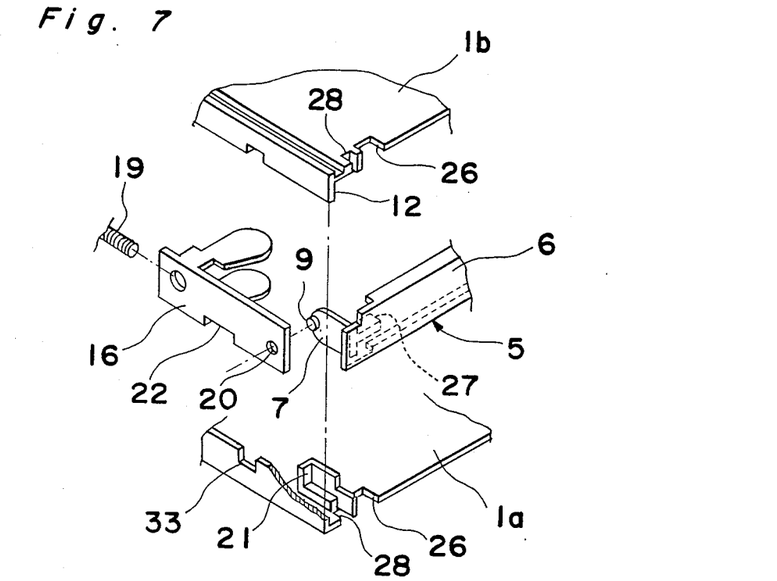
FIG. 7 is an exploded view showing the front side corner portion of the case body shown in FIG. 6 with the part of the front lid shown.

There is defined a hole 20 for receiving the support shaft 9 of the front lid 5 in the front end portion of the lid supporting member 16 as shown in FIG. 7, whereby the support shafts 9 of the front lid 5 are adapted to be fitted in the hole 20 from inside of the case body 1 so that the front lid 5 can rotate around the support shaft 9.

Figure 8:
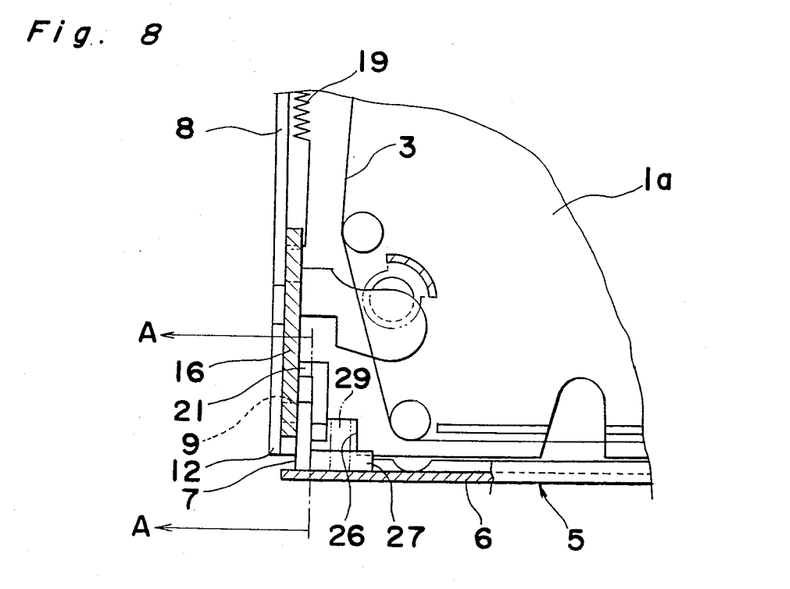
FIG. 8 is a partial plan view showing the case body shown in FIG. 6.

When the tape cartridge is not used, each of the lid support members 16 escapes toward the rearmost end portion by the coil spring 19 and the front lid 5 both ends of which are suspended by the lid supporting members 16 is fitted in the opening between the top wall and the bottom wall of the case body 1 with the front plate 6 vertically standing as shown in FIG. 8 so as to close the opening of the front portion of the case body 1. The movement of the support members 16 and the front lid 5 in the backward direction is limited by receiving the rear end of the connecting arms 7 by stoppers 21 provided on both front corner portions of the case body 1. The end of the movement of the front lid may be limited in such a manner that the outer surface of the front plate 6 is flush with the front edges of the top wall and the bottom wall of the case body 1. However, it is desired to set the limit of the movement of the front lid at the position slightly set back from the front edge of the top and bottom walls of the case body 1 as shown in this embodiment.

It is appreciated that the front lid 5 including the front plate 6 and the connecting arms 7 is situated inside the case body 1, so that the front lid 5 is prevented from being manually drawn out of the case body 1. It is also appreciated that the front portion of the case body 1 can not be opened without drawing the front lid out of the case body 1 since the top edge and the bottom edge of the case body 1 closely oppose the edges of the front plate 6. Thus, the recording tape can be well protected by the front lid 5.

Figure 9:
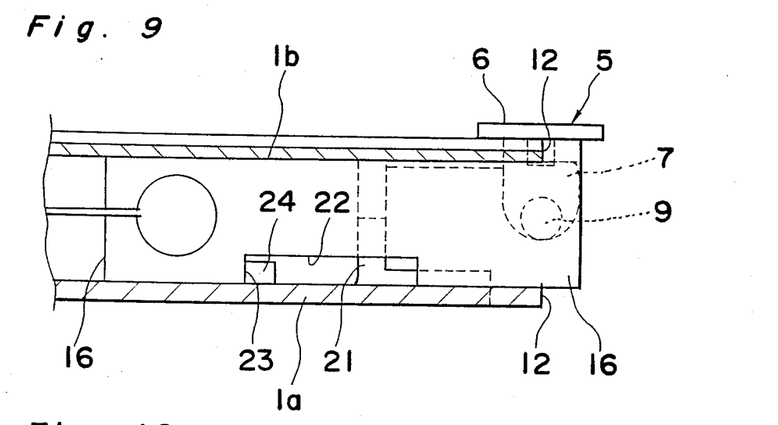
FIG. 9 is a partial cross sectional view showing the part of the tape cartridge according to the present invention with the front lid fully opened.

There are defined a cut portion 22 in a rectangular shape in the lower end portion of the lid support member 16 as shown in FIG. 9 and the rear end face 23 of the cut portion 22 is adapted to engage with a stopper 24 projected from the bottom wall 1a of the case body 1 so that the movement of the front lid 5 in the frontward direction is limited by the stopper 24, thereby preventing drawing out of the front lid 5 beyond the stopper 24. The frontward limit of the movement of the front lid 5 is so set that the connecting arms 7 are not fully drawn out of the case body 1. Apparently, the front lid 5 can be automatically drawn back to the rearward limit position if the force applied to the front lid 5 is released.

When the tape cartridge is mounted on the tape player, the front lid 5 can be opened in the upward direction despite that the top and the bottom of the case body is reversed. For this purpose, there are provided a pair of cut portions 26 so as to oppose each other on both lateral end portions of the front end of the top wall 1b and the bottom wall 1a of the case body 1 as shown in FIGS. 6 through 9, and thick chips 27 are formed as shown in FIGS. 1 and 10 on the positions opposing the cut portion 26 on the intermediate portions of each of the inner faces of the front plate 6.

Figure 10:
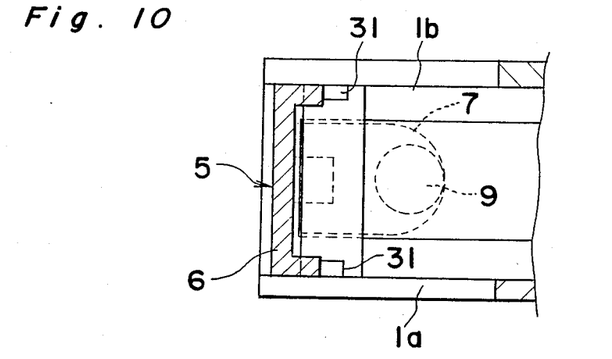
FIG. 10 is a cross sectional view taken along the lines A—A in FIG. 8.
Figure 11:
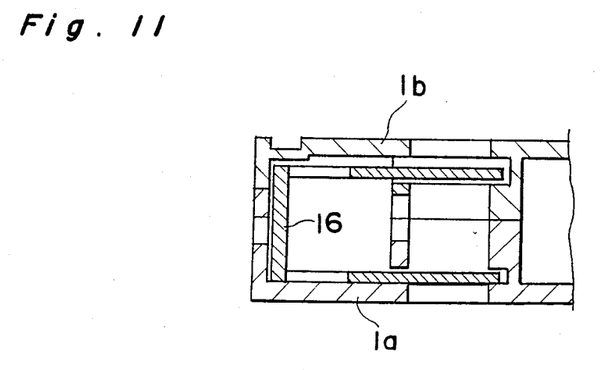
FIG. 11 is a partial cross sectional view of the tape cartridge with the front lid drawn out.
Figure 12:
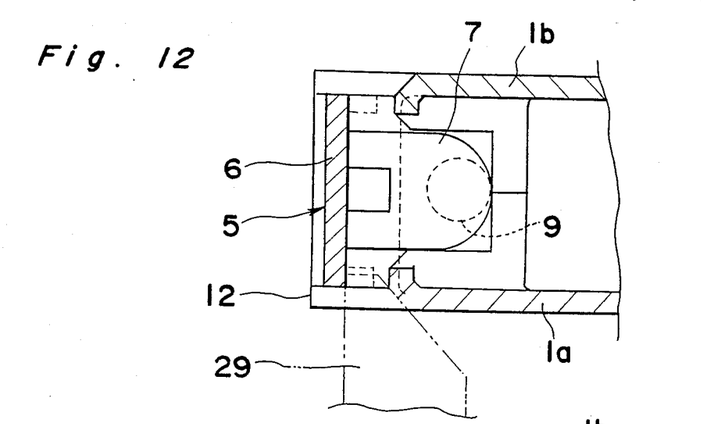
FIG. 12 is a partial cross sectional view of the tape cartridge with the front lid retracted.
Figure 13:
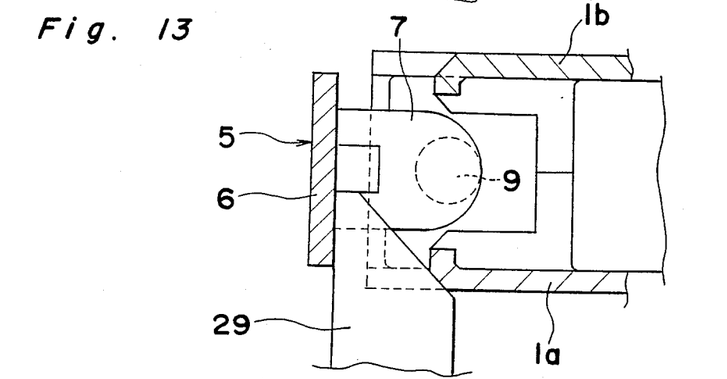
FIG. 13 is a partial cross sectional view of the front portion of the tape cartridge with the front lid drawn out before being opened.
Figure 14:
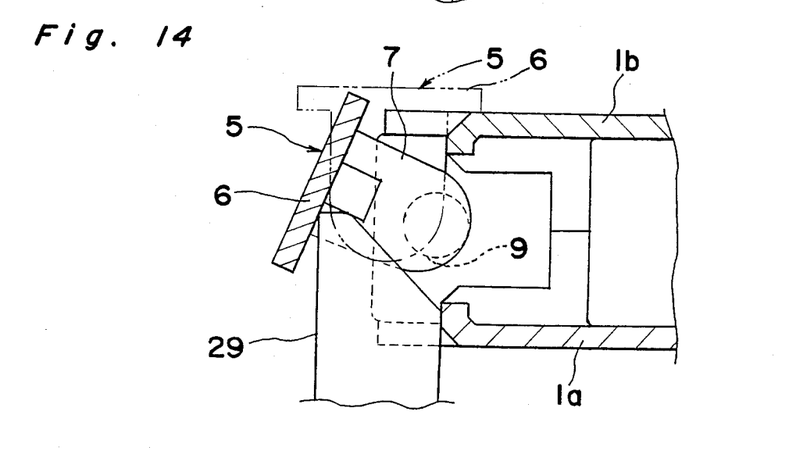
FIG. 14 is a partial cross sectional view of the front portion of the tape cartridge with the front lid drawn out and opened.
Figure 15:
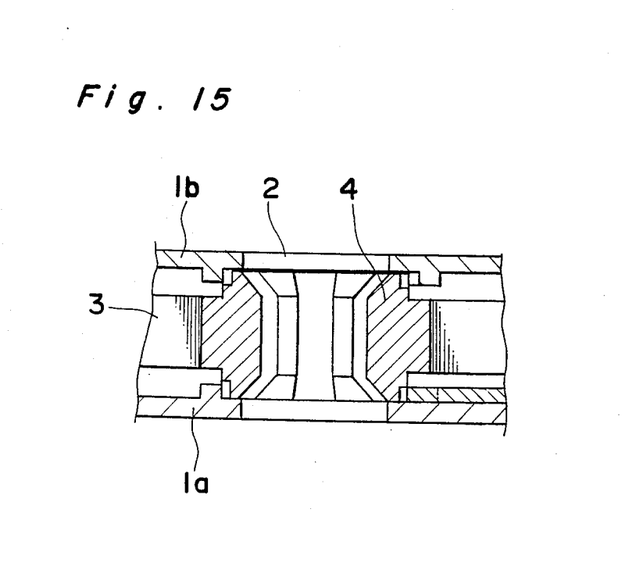
FIG. 15 is a partial cross sectional view of the essential portion of the hub used in the tape cartridge.
Figure 16:
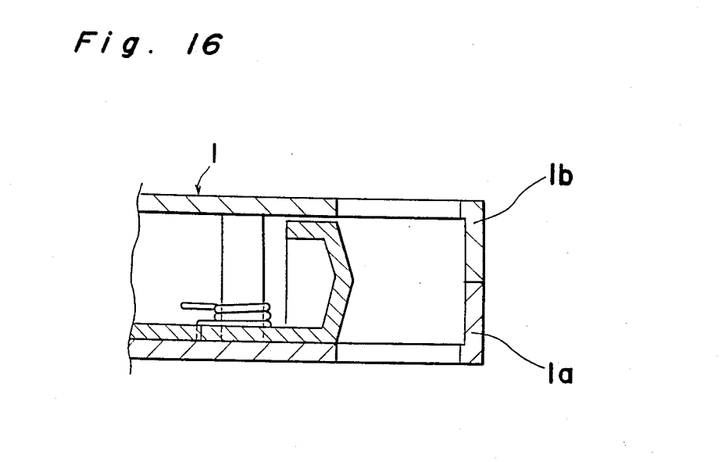
FIG. 16 is a partial cross sectional view showing the front portion of the tape cartridge.
Figure 17:
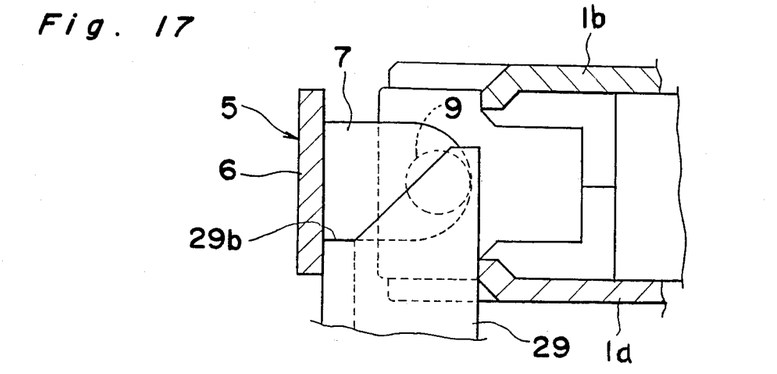
FIG. 17 is a partial cross sectional view of the tape cartridge with the front lid drawn out but in the closed position.
Figure 18:
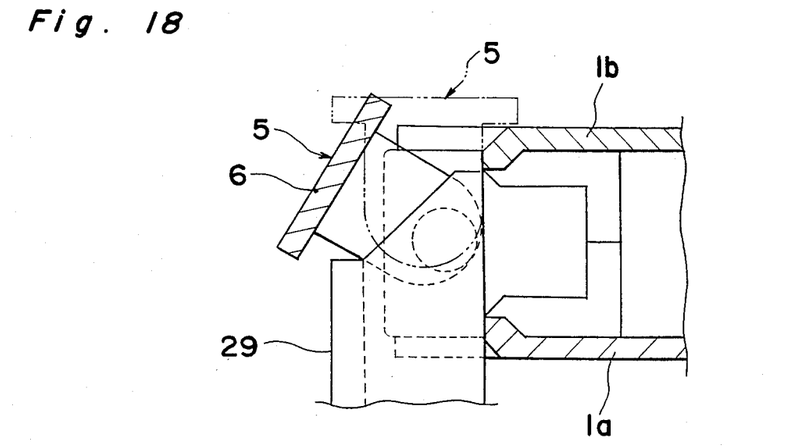
FIG. 18 is a partial cross sectional view of the tape cartridge with the front lid opened.
Figure 19:
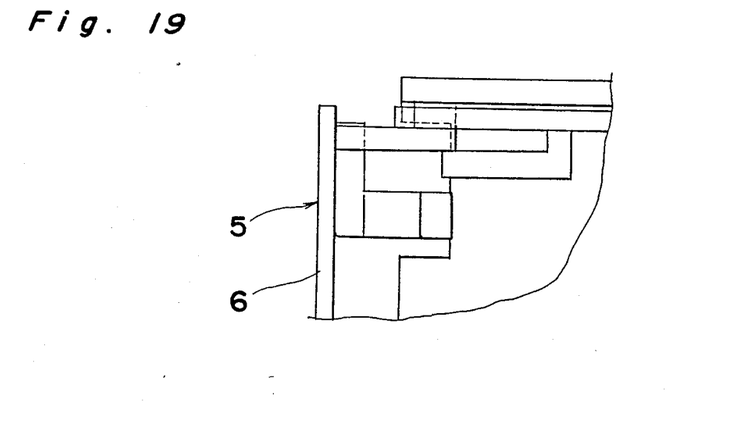
FIG. 19 is a partial plan view of the tape cartridge.
Figure 20:
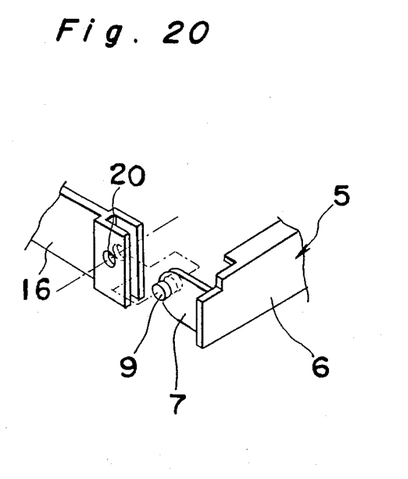
FIG. 20 is an exploded view of an essential portion of the front lid used in the various embodiments of the present invention.
Figure 21:
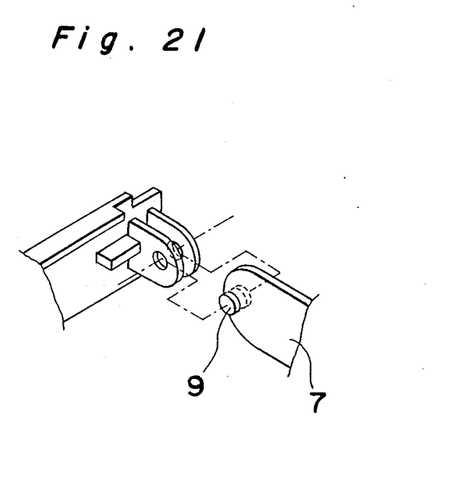
FIG. 21 is an enlarged exploded view of the essential portion shown in FIG. 20.
Figure 22:
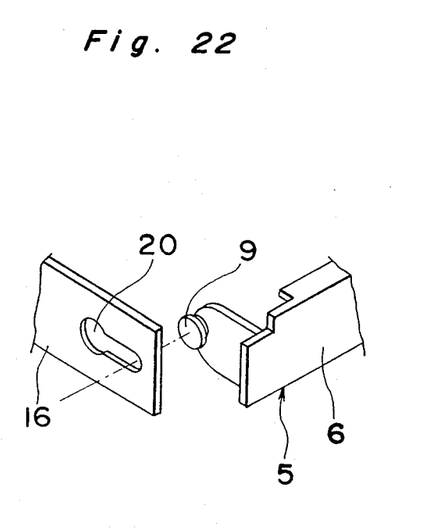
FIG. 22 is an exploded view of an essential portion of the end portion of the front lid used in the various embodiments of the present invention.
Figure 23:
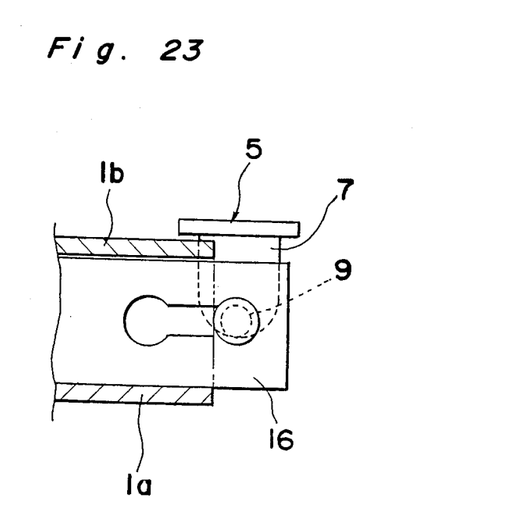
FIG. 23 is a partial cross sectional view showing one way mounting of the front lid to the case body.

By this arrangement, when the tape cartridge is mounted on the tape player and moved down to the load position, the top ends of a pair of operating members 29 of the tape player, each having a slanted surface 29a as shown in FIG. 10 are adapted to face the cut portions 26. Since there is formed a guide surface 26a slanting down in the backward direction at the innermost portion of each of the cut portions 26, the operating member 29 can be inserted into the space between the front wall of the case body 1 and the front lid 6 of the front lid 5 through the cut portion 26. Then by the relative movement of the case body 1 and the operating member 29, the operating member 29 can advance further into the inside of the cut portion 26, the slated surface 29a of the operating member 29 slidably engages with guide surface 26a, thereby the causing the case body 1 to move in the backward direction. As a result, the front lid 5 can be drawn up to the front limit position from the case body 1 with the top end of the operating member 29 engaged with the engaging member 27 of the front plate 6 whereby the operating member 29 can be further pushed upwardly so that the front lid 5 can be upwardly opened angle of 90 as shown in the phantom lines in FIG. 14 so as to enable the recording tape 3 to be drawn out from the front opening of the case body 1.

There are defined two pair of additional recesses 28 near both outer lateral side portions of the respective recesses 26 in the front portion of the top wall 1b and the bottom wall 1a of the case body 1 in such positions that each of the additional recesses on the top wall 1b oppose the corresponding additional recesses of the bottom wall each opposing so that each of the connecting arms 7 can be received in the additional recesses 28 when the front lid is in the open end for avoiding undesired projection of the front plate from the front portion of the case body 1 as shown in FIG. 5. Since the connection arms 7 can be received in the additional recess 28 as described above, disengagement of the supporting shafts 9 from the holes 20 can be prevented in spite of an undesired application of force to the front plate 6 in the lateral directions due to the engagement of the front lid 5 and the operating member 29 when the front lid 5 is opening or fully opened.

The supporting holes 20 can be formed in a vertical elongated shape so that the supporting shafts 9 can be moved in the holes 20 for preventing undesired projection of the front lid 5 from the front end portion of the case body when mounted in the tape player as shown in FIG. 9.

It is noted that the term of front end portion of the case body used herein includes the end face 10 or the front face 12 without the end face 10 relating to the side walls 8.

As understood from the foregoing, the tape cartridge according to the present invention is not required to define a recess on the front lid for allowing insertion of the positioning member of the tape player by providing at least one reference wall on the front portion of the lateral outermost end portion of the case body for engagement of the positioning member of the tape player. Therefore, the mechanical strength of the front lid can be assured and undesired access of the positioning member of the tape player to the recording tape can be prevented.

Figure 6:
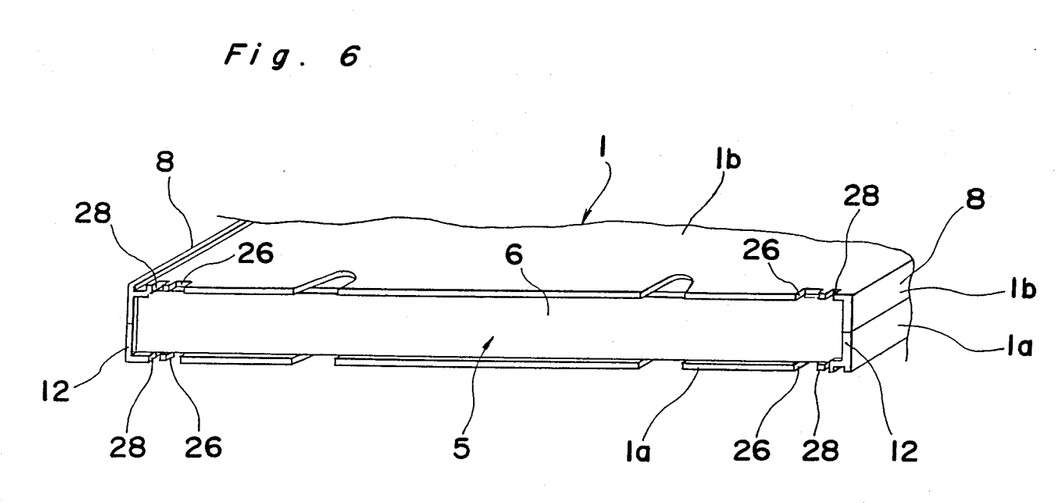
FIG. 6 is a partial perspective view of the front portion of the case body used in a further embodiment of the present invention.

In one feature of the tape cartridge according to the present invention, it is expected that the case body 1 is made small in size, therefore the front plate 6 of the front lid 5 is also made relatively thin. Accordingly, as shown in FIG. 6, there may be formed a pair of ribs 30 between the engaging members 27 in the vertical ends of the inside of the front lid 5 for reinforcement of the front plate 6. In addition, by making the recording tape 3 to run between the ribs 30 along the front plate 6, the ribs 30 can serve to prevent undesired contact of foreign matter with the recording tape. Furthermore, there are projectedly formed additional ribs 31 on the inner face of the front edge of the top wall 1b and the bottom wall 1a of the case body 1 between the tape guides 5, so that the ribs 30 are situated close to the additional ribs 31 when the front lid 5 is in the rearmost position.

Although the present invention is fully described with reference to the example of a digital audio recording tape cartrige, the present invention can be applied to a video tape cartridge or the like.

What is claimed is:

1. In a tape cartridge comprising a case body of a predetermined thickness having a pair of side walls, top and bottom walls and a front lid having a front plate with a front face and connecting members projected away from respective end portions of said front plate, said front lid being movable on support shafts between a closed position and an opened position, characterized in that a reference surface is provided as a vertical front end face corresponding to the thickness of each case body formed on each side wall of said case body, said respective end faces being directed in a front direction relative to said front lid so as to position said case body in relation to a front to rear direction in a tape player, said reference surfaces being positioned outside of and extending frontward lateral to said respective connecting members of said front lid and extending frontward beyond said support shafts of said front lid lateral to said end portions of said front plate so that said reference surfaces can readily contact corresponding position members of a tape player.

2. The tape cartridge according to claim 1, wherein said front end face reference surfaces of the side walls are flush with said front face of said front plate of the front lid.

* * * * *